United States Patent [19]

Presley

[11] Patent Number: 4,869,538
[45] Date of Patent: Sep. 26, 1989

[54] ENCOMPASSING INFLATABLE SAFETY BUMPER SYSTEM

[76] Inventor: John M. Presley, V. A. Medical Center, 12 Veterans St., Tomah, Wis. 54660

[21] Appl. No.: 283,420

[22] Filed: Oct. 25, 1988

Related U.S. Application Data

[63] Continuation-in-part of Ser. No. 60,230, Jun. 10, 1987, abandoned.

[51] Int. Cl.⁴ .............................................. B60R 19/20
[52] U.S. Cl. ..................................... 293/107; 293/127; 293/102
[58] Field of Search ............... 293/102, 107, 108, 110, 293/120, 122, 127, 126, 128, 134

[56] References Cited

U.S. PATENT DOCUMENTS

| | | | |
|---|---|---|---|
| 1,380,759 | 6/1921 | Whitaker Jr. | 293/107 |
| 1,446,708 | 2/1923 | Kunkel | 293/107 |
| 1,457,259 | 5/1923 | Malluk et al. | 293/107 |
| 1,486,660 | 3/1924 | Hajdu | 280/770 X |
| 1,504,581 | 8/1924 | Schmidt | 293/107 |
| 1,552,965 | 9/1925 | Smith | 293/110 |
| 3,837,695 | 9/1974 | Haase et al. | 293/110 |
| 3,938,840 | 2/1976 | Haase et al. | 293/110 |
| 4,324,301 | 4/1982 | Eyerly | |

FOREIGN PATENT DOCUMENTS

| | | | |
|---|---|---|---|
| 2650286 | 5/1978 | Fed. Rep. of Germany | 280/770 |
| 1144368 | 2/1956 | France | 293/107 |

Primary Examiner—Russell D. Stormer

[57] ABSTRACT

A bumper-like member for a vehicle that surrounds the vehicle is formed of a closed flexible, hollow container with a tube or bladder filled with compressed air. The air-filled encompassing bumper is attached to a backing plate. The backing plate is attached to a supporting brace which is mounted to the frame of an automobile employing a rubber spacer to further absorb impact energy. Compressed air for the bumper unit(s) is supplied through a shraeder valve appendage. This surrounding unit serves as a safety device by providing a significant amount of flotation to allow passenger(s) escape if the vehicle enters deep water.

7 Claims, 5 Drawing Sheets

ENCOMPASSING INFLATABLE SAFETY BUMPER SYSTEM

This application is a continuation-in-part of U.S. application Ser. No. 060,230, Filed June 10, 1987 and now abandoned.

References Cited:

| References Cited: | | | | |
|---|---|---|---|---|
| 3,971,583 | 7/76 | Kornhauser | 293/71 | P |
| 3,837,695 | 9/74 | Haase et al | 293/71 | P |
| 3,938,840 | 2/76 | Haase et al | 293/71 | P |
| 1,552,965 | 9/25 | Smith | 293/71 | P |
| 4,324,301 | 4/82 | Eyerly | 180/2 | R |
| 1,144,368 | 4/57 | Flaichez | 293/107 | P |
| 1,380,759 | 6/21 | Whitaker | 293/107 | P |
| 1,446,708 | 2/23 | Kunkel | 293/107 | P |
| 1,457,259 | 5/23 | Mailluk et al | 293/107 | P |
| 1,486,660 | 3/24 | Hajdu | 280/770X | |
| 1,504,581 | 8/24 | Schmidt | 293/107 | P |

BACKGROUND OF THE INVENTION

Pneumatic bumpers that have previously been known were designed to protect a motor car, bus, or truck in only the front and rear. This invention significantly improves all previous notions because it affords protection for the sides of the vehicle as well as the front, rear and corners. The differences in the several pneumatic bumpers revolve around various claims of better shock absorption using complicated devices to effect less damage for only the front and rear of the vehicle.

This invention is an improvement in three highly important areas. It provides (1) better protection for the passenger, vehicle, pedestrian or objects from all angles of collision in a relative simple, economical fashion. (2) A raft-like floating component that significantly adds to the safety of passengers in the instances of entering deep water. (3) A mounting system that supplies strength and additional secondary shock absorption.

SUMMARY OF THE INVENTION

The invention is designed to provide a superior and unique impact system for the entire circumference of the vehicle that will greatly enhance the safety factors for various types of vehicles, especially the common passenger automobile.

Existing bumper systems provide relatively poor protection for the passenger in the vehicle. No protection is provided for the sides of the vehicle and very little impact absorption is contained in modern bumpers from the front and rear of the vehicle. A tremendous need exists for a simple, comprehensive pneumatic bumper that is practical and economically feasible enough to insure widespread usage in the U.S. and elsewhere in the world. Previous pneumatic bumper concepts do not purport to surround or encompass the automobile. The mounting system of this invention is unique and practical providing additional protection. The surrounding bumper requires little or no maintenance.

Human safety is paramount in the importance of this invention. Protection for the vehicle is very crucial and the obvious benefits of lowered insurance rates are welcome. Even pedestrian collisions will be lessened in damage.

The tremendous need for additional safety for automobiles need not be documented since everyone realizes the overwhelming proportion of small automobiles in use and the prevalence of drivers under various kinds of chemical influence. High costs exist for repair for even relatively small sideswipes (damages) to moving or stationery vehicles. No previous pneumatic bumpers are mounted to offer any protection for the sides of the vehicle where death frequently occurs to the driver or passengers from a 90° collision.

This encompassing system offers significant protection involving collision with other moving vehicles, parked vehicles, pedestrians and other stationery objects (trees, telephone poles, walls, posts, trash can, etc.). The protection is greatly enhanced if a collision occurs between two vehicles equipped with the encompassing inflatable system.

The inflatable bumpers are mounted one to two feet or more from the ground, depending on style and size variables of the vehicle and may be contoured out for wheel turning in the front or rear of the vehicle.

Modifications of existing vehicles can employ the system and new vehicles can adapt easily. Styling and aesthetic achievement can be mastered in many ways. Black is the most practical color but a variety of colors may be used to blend with the vehicle styling. Fiberglass covers can be optional equipment but are not needed for safety.

Modern styling lends itself easily to wrap all the way around inflatable bumpers. The encompassing inflatable safety bumper system is shaped to coincide with the outer perimeter of the vehicle. There can be breaks, if necessary, in the circular/oval continuity for opening doors or curved corners. Many vehicles are suited for the inflatable bumper system to be mounted beneath the door opening. Eventually, manufacturers of vehicles may consider this advantage and design vehicles accordingly. Separate units can be used while blending in with the encompassing system. Compressed air to maintain inflation of the bumper is supplied by many service stations if ever needed.

Rubber, vinyl, cord-supported, steel-supported materials similar to sidewalls of tires compose the outer part of the system and contain the inflatable tube. Steel-belted outer walls are recommended for the front and rear; softer (bias-type) for the sides. The inflatable component may consist of a single outer flexible wall, but employing an inner inflatable member facilitates replacement. The cylindrical container can be a continuous round/oval/rectangular shape or be in parts that have molded ends to the cylinder.

The front end of the vehicle and front "corners" are subject to the most dangerous impacts, therefore, an optional layer of bumpers or stacked group may be employed. A backplate could be used for each layer.

The most practical application of the bumper system is to use one layer and attach the bumper system horizontal to the ground. For certain vehicles and for certain styling innovations, short, vertical smaller units may be employed. These units are attached to the vehicle frame in the same manner as described. A separate backing plate and smaller brace (arm) is used with the rubber spacer for each unit.

The invention is more reliable than systems that inflate upon impact. The inflatable bumper system is constantly inflated whether or not there is impact.

DETAILED DESCRIPTION OF THE INVENTION

Figure 1:
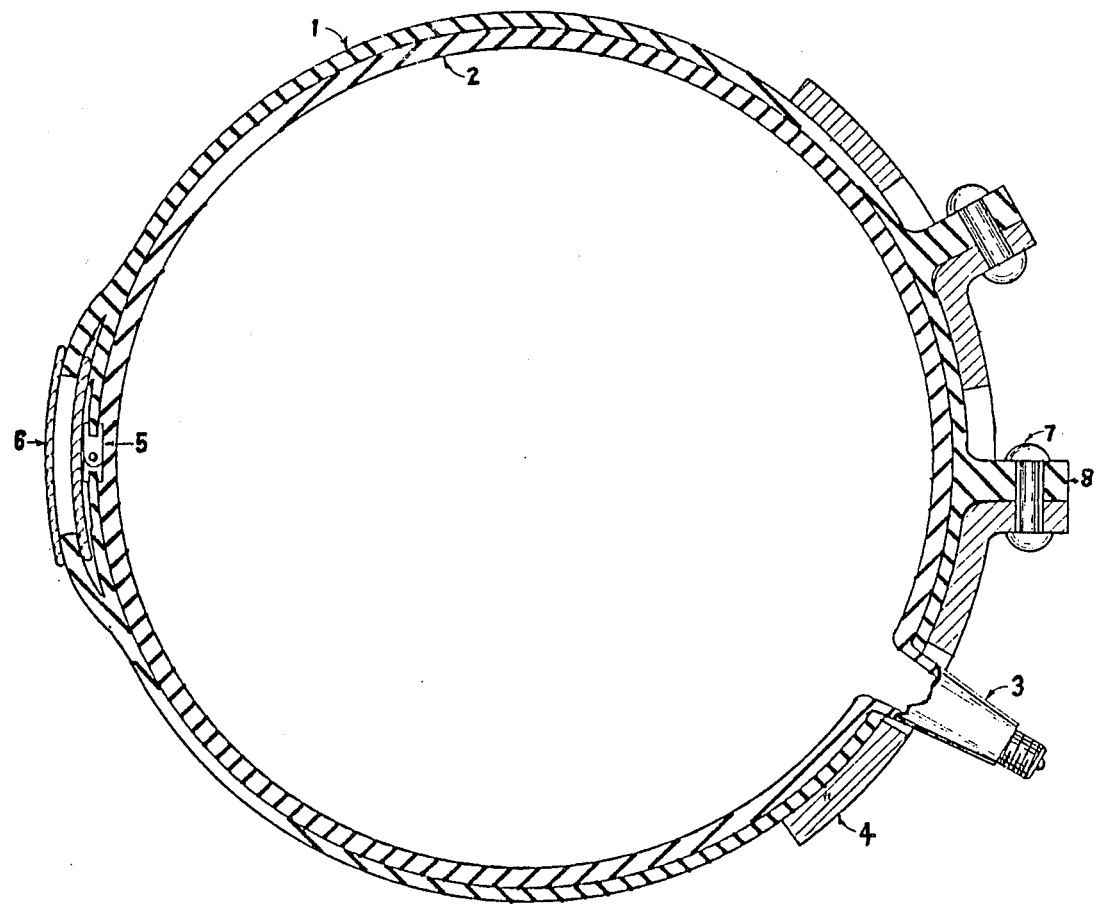
FIG. 1 is a cross-sectional view of the pneumatic bumper illustrating the attachment of the bumper casing to the backplate.

The main component of the encompassing inflatable bumper system consists of an inflated tube (2) inside a flexible outer wall (1). It is cylindrical in shape. The tube is inflated at the bottom inside surface using a shraeder-type valve (3). Compressed air is used to inflate the bumper system to approximately 22 lbs. pressure. The diameter of (1) is 12" but can vary according to the size of the vehicle. A concave backplate (4) approximately one fourth size of the circumference of the inflatable bumper is mounted to a brace (10) which is mounted to the basic vehicle frame (15) to support the inflatable bumper system.

Figure 2:
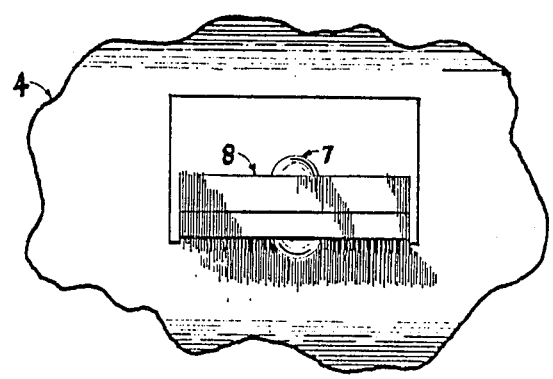
FIG. 2 depicts one of the bolts clamping one of the casing flanges to one of the flanges of the backplate.

The inflatable components of the bumper (1,2) are attached to the backplate (4) by inserting the molded half-rings (loops) (8) of the outer shell (1) into the rectangular loop-holes (16). A pin (7) approximately two inches in length with ½ inch diameter clamps the loop of the outer wall (8) to the protruding lip 9 of the backing plate (4). (The pin can be a bolt, nut and cotter pin.) FIG. 2 illustrates the rear view of the clamped loop (8) to the backplate (4). The backplate (4) is attached to a slightly curved flange welded to the brace (solid round steel 3" in diameter) or arm (10). This attachment is by four bolts 1½" length and ½" diameter through four holes in the flange. The brace (10) is attached to the frame of the vehicle (15) by means of an extended bolt-like appendage (12) that is an integral part of the arm (10). The bolt-like extension 1½" diameter 4" long (12) penetrates the frame (15) through a 1½" hole and is secured by a castlelated nut (13) and cotter pin (14). A two inch solid rubber spacer (11) surrounds the appendage-bolt (12) to further absorb shock when the vehicle is impacted.

Figure 3:
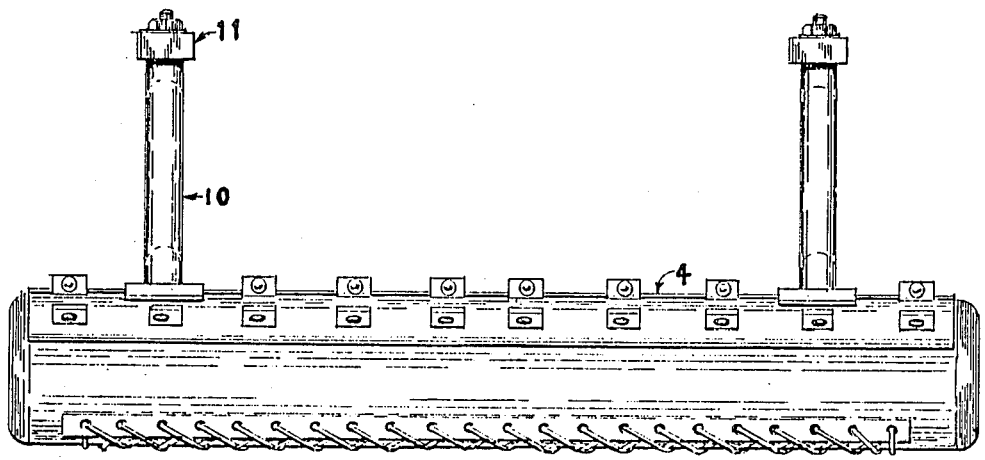
FIG. 3 is a top-view of the bumper, backplate, braces and spacers.
Figure 4:
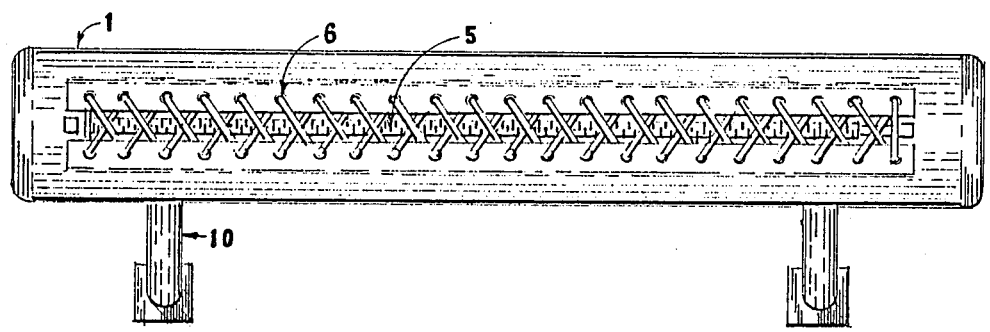
FIG. 4 illustrates the zipper and lacing which contain the inserted tube/bladder.
Figure 5:
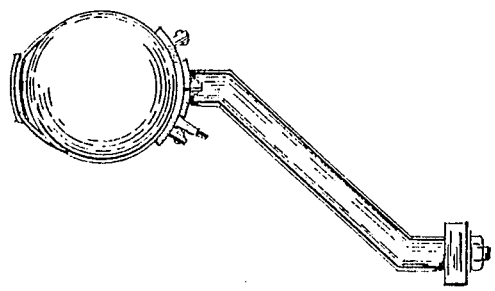
FIG. 5 is a cross-sectional view of the bumper, backplate, brace and spacer.
Figure 6:
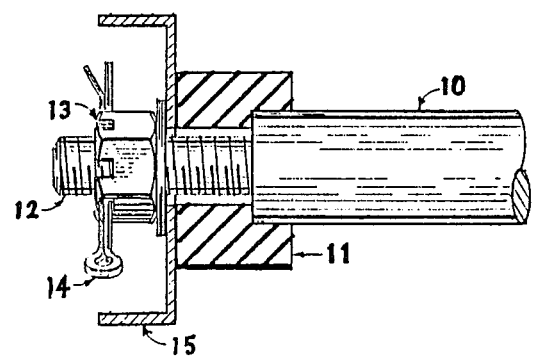
FIG. 6 is a cross-sectional view of the attachment of the brace to the frame of the vehicle.
Figure 7:
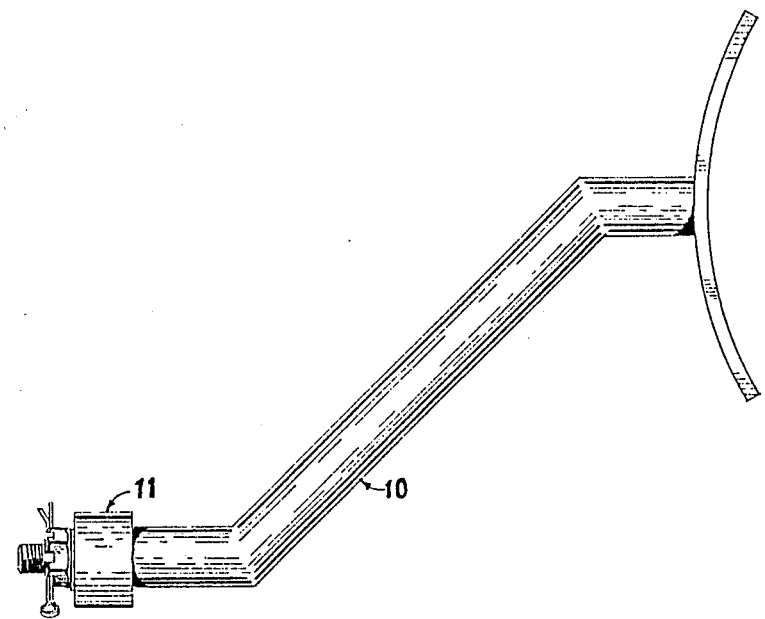
FIG. 7 is a side view of the brace illustrating the spacer on the end which is attached through the frame.
Figure 8:
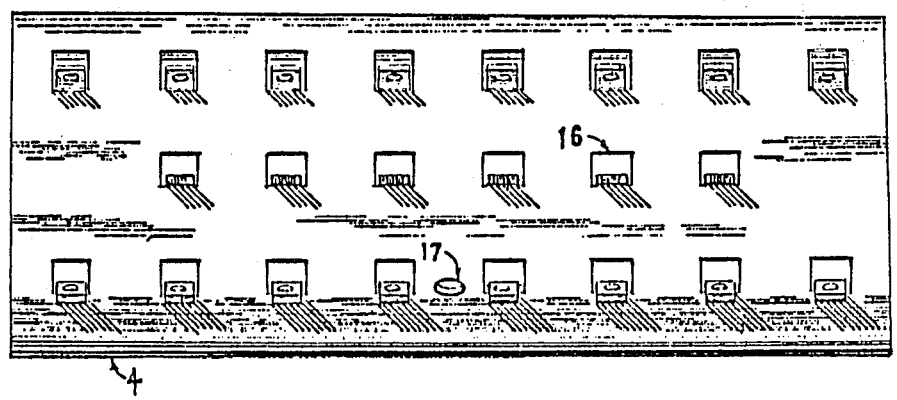
FIG. 8 is a view of the backplate illustrating the backside or vehicle side.
Figure 9:
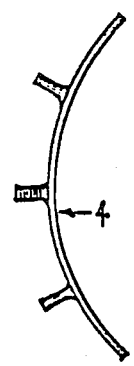
FIG. 9 is a cross-sectional view of the backplate with protruding flanges.
Figure 10:
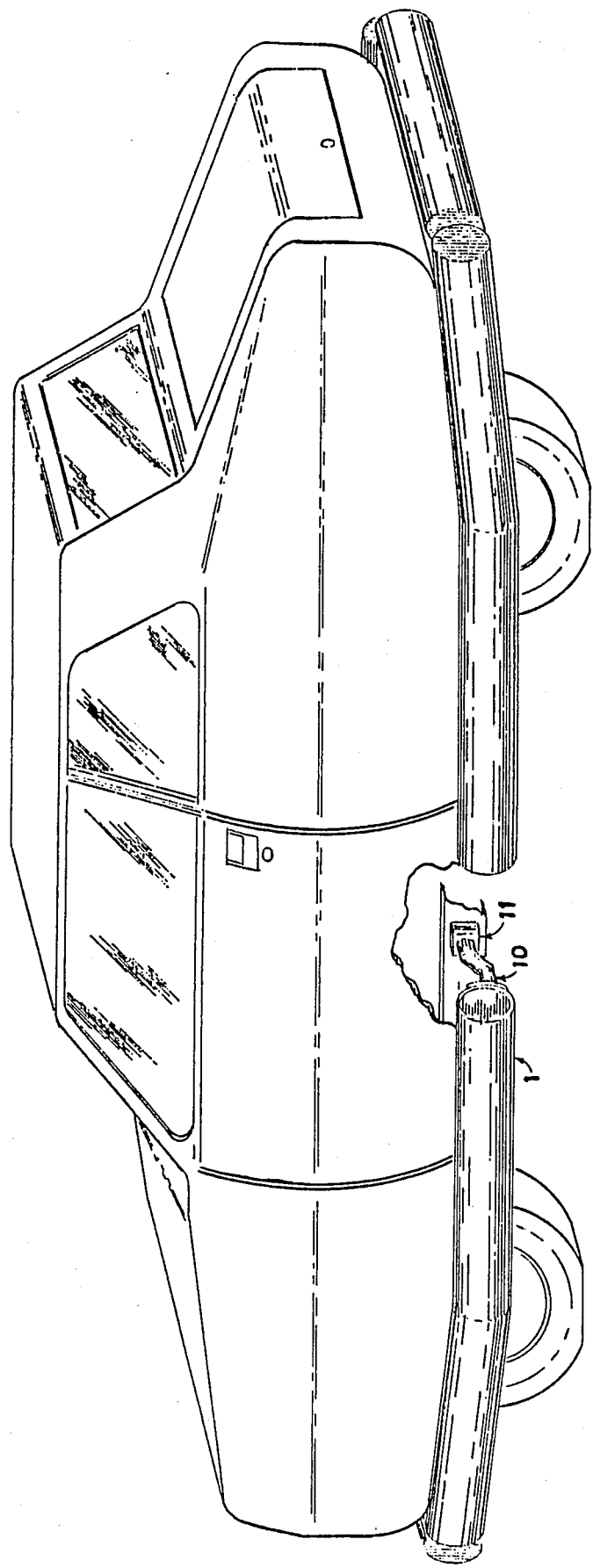
FIG. 10 illustrates the attachment of the encompassing inflatable bumper to a vehicle.

Most vehicles have a cross member to the basic frame at the front and rear. If absent, a cross member of approximately the same shape and quality is welded to the sides of the frame at a 90° angle. The length and angle of the brace/arm (10) varies with the contour of the vehicle to the spot where it is attached to the frame. A typical length would be a two inch horizontal flow of the arm from the backplate bending down to a 45° angle (10), approximately 12" bending back horizontally another three inches entering the frame (15). The purpose of the mounting apparatus for the pneumatic bumper is to give added protection in a collision, supportive strength to secure the bumper in a fixed position and facilitate any replacement that may be required. The purpose of the rectangular slots (16) in the backing plate (4) is to assist the attachment of the pneumatic bumper (1,2) to the steel backing plate (4) and to help equalize pressure points when the bumper is engaged. The zipper (5) is made long enough to insert the tube/bladder (2). The lace string (6) made of durable vinyl secures the opening further (as used in the construction of a football). The zipper (5) and lacing (6) is better placed on the plate-side of the inflatable bumper for strength and aesthetic reasons (though illustrated (FIGS. 3, 4) on the front side, for the sake of clarity. Hole 17 in backplate (4) through which shraeder valve is inserted is provided for stability.

The inflatable tube/bladder (2) encased in the flexible outer shell/wall (1) completely surrounding the vehicle provides sufficient buoyancy/flotation for the vehicle to keep it from sinking in water in some instances, depending upon the weight of the vehicle, the diameter and the length of the inflatable bumper. In all instances, a significant amount of flotation is provided to enable the passenger(s) to escape.

The inflatable tube/bladder (2) is made of synthetic thermoplastic resin, preferably of the vinyl type. The outer flexible protective cover (shell/wall) is made of wear-resistant rubber or vinyl to provide endurance and resiliency.

What is claimed is:

1. A pnuematic bumper system for a vehicle comprising:
    a backing plate having a plurality of apertures therethrough and a plurality of lip members projecting from a first side of said backing plate;
    a flexible tubular shell member adjacent a second side of said backing plate having a plurality of loop members projecting from one side thereof and extending through the apertures in said backing plate to abut said lips; and
    fastening means for joining said loop members and said lip members to form a bumper unit.

2. The bumper system of claim 1 further comprising an inflatable tubular member disposed inside and encompassed by said tubular shell member.

3. The bumper system of claim 2 further comprising a shraeder valve secured to said inflatable tubular member.

4. The bumper system of claim 1 further comprising apertures extending through said loop members and said lip members, and said fastening means comprises pin means extending through the apertures in said loop members and said lip members.

5. The bumper system of claim 1 further comprising mounting means for mounting said backing plate to a vehicle.

6. The bumper system of claim 1 wherein said system further comprises a plurality of bumper units mounted to the front, sides, and rear of a vehicle.

7. The bumper system of claim 6 wherein said system acts as a flotation device for said vehicle.

* * * * *